United States Patent Office 3,144,346
Patented Aug. 11, 1964

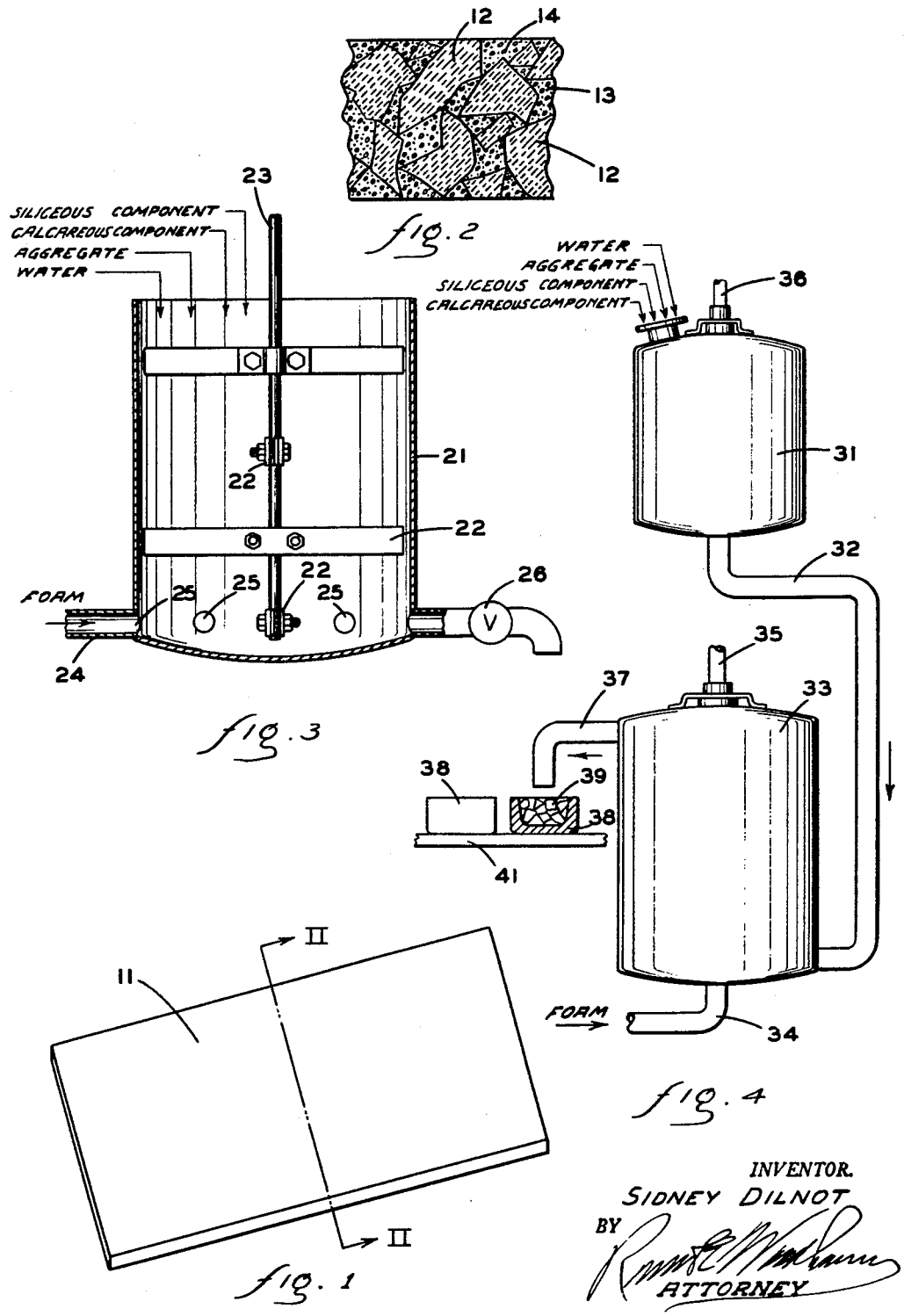

3,144,346
CALCIUM SILICATE HYDRATE PRODUCTS
Sidney Dilnot, Langley, Bucks, England
Filed Feb. 12, 1954, Ser. No. 409,792
Claims priority, application Great Britain Dec. 14, 1951
13 Claims. (Cl. 106—75)

This invention relates to light weight construction materials, particularly to a calcium silicate hydrate product characterized by a combination of low apparent density, high strength and a low moisture movement, and to a method for making it. This application is a continuation-in-part of co-pending application Serial No. 324,400, filed December 5, 1952, now abandoned.

Calcium silicate hydrate products are formed conventionally by mixing ground inorganic calcareous substances, which furnish reactive lime, and ground inorganic siliceous substances, which furnish reactive silica, with water and allowing the mixture to harden under conditions favoring the formation of calcium silicate hydrate. The indurating or hardening step is usually carried out under a pressure of 140 to 150 pounds per square inch of saturated steam. These products are distinguished from ordinary cement products or concrete by the presence of crystalline calcium silicate hydrate.

Calcium silicate hydrate products and ordinary concrete or cement products undergo a relatively high degree of expansion and contraction on wetting and drying. Such expansion and contraction is generally referred to as the "wetting and drying movement" or the "moisture movement" of the product. The high apparent density and high moisture movement of calcium silicate hydrate products are major disadvantages in relatively large structural units, such as panels several feet long. The art has mainly sought a solution to the problem of producing calcium silicate hydrate products which have low apparent density, a high degree of strength and a suitable low degree of expansion and contraction during wetting and drying.

Low apparent density calcium silicate hydrate products have heretofore been prepared from a suspension of calcareous and siliceous components in a large excess of water so that the final product, after hardening, consists of a porous skeleton of calcium silicate hydrate containing a multitude of inter-connected microscopic channels. The evaporation of the water filling the channels after the hardening operation is completed is frequently very difficult to accomplish without injury to the formed article. The moisture movement of the final product is undesirably high.

The present invention comprises a calcium silicate hydrate product, and the method for making it, characterized by low dry apparent density, high compressive strength, and moisture movement much less than that of heretofore available products of corresponding strength and apparent density. This advantageous combination of properties is effected by forming the calcium silicate hydrate product as a matrix or web of aerated calcium silicate hydrate surrounding and adhering to the particles of light weight porous aggregate of the type hereinafter defined. Unexpectedly, the light weight aggregate adds greatly to the compressive strength of the product, the strength being a great deal more than would be expected from a consideration of the compressive strength of the calcium silicate hydrate matrix alone of the same apparent density and having interconnected microscopic channels. The increase in strength due to the light weight aggregate depends to some extent upon the particular aggregate employed, but is uniformly high for the aggregates hereinafter defined. The unexpected contribution of the porous aggregate to the strength of the product of this invention is in contradistinction to the known fact that the use of a light weight aggregate in the making of concrete leads invariably to a great reduction in compressive strength of the article made.

The strength of the matrix of aerated calcium silicate hydrate can be maintained at a comparatively high value by grinding the siliceous and calcareous components, and by finely adjusting their proportions.

Products of the invention can be prepared easily having a desirable combination of properties within the following approximate ranges:

Dry apparent density__pounds per cubic foot__  40–45
Compressive strength:
    (a) Saturated__pounds per square inch__  600–900
    (b) Dry _____do____  900–1800
Moisture movement _____percent__  0.02–0.05

However, it should be pointed out that the calcium silicate hydrate product of the invention is not limited to a product having properties falling within these desirable ranges. Thus, products can be prepared according to the invention having a dry apparent density as high as 80 pounds per cubic foot, or higher, or as low as about 20 pounds per cubic foot, it being understood that the values for the compressive strength and, to some extent, for the moisture movements of such heavier and lighter products may lie outside the ranges just given, but that they are of comparably advantageous values as compared with conventional products of equal dry apparent density.

The term "calcareous component" means an inorganic substance which, under the conditions employed in the indurating step of the process herein defined, furnishes lime for the formation of calcium silicate hydrate. Calcareous substances which can be employed in making the calcium silicate hydrate product of the invention include quicklime, slaked lime, Portland cement, hydraulic cement, natural cements and others, as well as mixtures thereof.

The term "siliceous component" means an inorganic substance which, under the conditions employed in the indurating step of the process herein defined, furnishes silica for the formation of calcium silicate hydrate. Siliceous substances which can be employed in making the calcium silicate hydrate product of the invention include diatomaceous earth, sand, artificial or natural puzzolanas, pulverized fuel ash, silica flour, slag, some varieties of calcined shales and clays, and others, as well as mixtures thereof.

The term "porous light weight aggregate" as employed herein means a porous inorganic aggregate which, in the uncrushed dry state, has an apparent density of from about 10 to about 80 pounds per cubic foot. Preferred porous light weight aggregates are those having an apparent density in the uncrushed dry state of from about 35 to about 65 pounds per cubic foot. The bulk densities of such aggregates in the crushed state are, of course, considerably less than their apparent densities. Porous light weight aggregates which can be employed in making the calcium silicate hydrate product of the invention include pumice, selected clinker, expanded perlite, expanded shale, expanded clay, vermiculite, foamed slag, sintered aggregate and many others, as well as mixtures thereof.

The presence of pores in the aggregate is a contributing factor to the high strength of the indurated product. This may be because the calcareous and siliceous components can, during mixing of the ingredients, penetrate to an appreciable distance into the pore openings and that, following hardening and the formation of calcium silicate hydrate, a multitude of spines or spurs of calcium silicate hydrate, which are integral with the matrix of calcium silicate hydrate, remain projecting into and securely locked in the surface pores and thus anchor the aggregate securely to the matrix. It is also probable, considering the nature of the light weight aggregate, that some interaction may occur between the calcareous or the siliceous component of the mixture and the surface layers of the aggregate particles to form a calcium silicate hydrate and that this contributes to a firm bonding of the particles to the calcium silicate hydrate matrix. Porous aggregates having an apparent density of less than about 10 pounds per cubic foot and those having an apparent density greater than about 80 pounds per cubic foot are so light and heavy, respectively, that considerable difficulty may be experienced during the operation of the process due to segregation of the aggregate within the indurated mass.

Foams suitable for use in this invention are conveniently made by aerating an aqueous solution of a foaming agent in any suitable manner. The ratio of the volume of foam produced to the volume of the solution before aeration is the expansion factor of the foam.

Suitable foaming agents are available and familiar in the art from which foams can be made having an expansion factor of from about 6, or less, to about 18, or more, and the invention contemplates the use of foams having such expansion factors. In many instances a foam having an expansion factor of about 9 can be used with satisfaction. It is pointed out, however, that the invention is not limited as to the foaming agent employed or the expansion factor of the foam used. Suitable foaming agents which can be employed, often with a stabilizer, include saponin, peptones, albumin, soap bark, water-soluble cellulose ethers, hydrated cellulose dispersions, alkylnapthalene sulfonates, stabilized soaps, hydrolyzed proteins, and others, as well as mixtures thereof. Certain of the agents mentioned, e.g., hydrated cellulose dispersions, may often act principally as stabilizing agents for foams prepared using one or more other agents.

It is preferred to inject the foam under pressure beneath the surface of the slurry, preferably near the bottom, while the slurry is gently agitated so that the foam is distributed substantially uniformly through the slurry. This method has the advantage that air is not lost by the breaking of any foam bubbles by the agitation, because the foam is at all times submerged in the slurry. Consequently, the amount of air introduced into the slurry, and appearing in the final indurated product can be accurately controlled so that uniformity of product is easily attained.

The mixture of slurry and foam is molded to the desired shape and preferably is preset in the mold by letting it stand, preferably at elevated temperature, so that it becomes self-supporting so the bubble walls will not be ruptured by air expansion in the subsequent indurating step. The resulting shape may be indurated by heating it in an autoclave with saturated steam, preferably at about 100 to 200 pounds per square inch, corresponding to about 338 to 388° F. The preset time and indurating time are shortened by performing the presetting at about 90 to 150° F. The shapes may be indurated in or out of the mold. A typical hardening cycle involves allowing the cast article to remain in the mold for from five to seven hours at about 90 degrees Fahrenheit in a humid atmosphere, then removing the preset article while still in the mold to an autoclave and increasing its temperature therein to about 360 degrees Fahrenheit over a period of from two to four hours by admitting saturated steam and, after maintaining this temperature for from twelve to sixteen hours, decreasing the temperature to about 212 degrees Fahrenheit over a period of from two to four hours. Following the indurating step, the indurated article can be dried either by storing in a dry atmosphere or by subjecting it to a current of warm air.

The invention can be understood readily by reference to the accompanying drawing wherein, in the interest of clarity, certain features are shown on a somewhat exaggerated scale and wherein:

FIGURE 1 is an oblique view of a calcium silicate hydrate product of the invention in the form of an elongated panel;

FIGURE 2 is a fragmentary sectional elevation, somewhat enlarged, taken along the line II—II of FIGURE 1;

FIGURE 3 is a schematic representation of apparatus suitable for carrying out the mixing step of the process of the invention;

FIGURE 4 is a schematic representation of apparatus suitable for carrying out the process of the invention in a substantially continuous fashion.

Referring now to FIGURES 1 and 2, the panel 11, which may be an insulating panel of suitable dimensions, e.g., 4 feet x 8 feet x 2 inches, comprises a plurality of pieces of a granulated porous light weight aggregate 12, e.g., pumice, foamed slag, and the like, surrounded by a matrix or web 13 of calcium silicate hydrate having distributed throughout it a plurality of small spherical voids 14. The small voids 14 are filled with a gas, usually air, and are separated by walls or septums of relatively dense calcium silicate hydrate of relatively low microporosity. The entire panel 11 is a rigid body characterized by low apparent density, high degree of compressive strength and extremely low moisture movement.

The apparatus shown schematically in FIGURE 3 comprises essentially a mixing tank 21 fitted with suitable agitator blades 22 mounted on a central shaft 23 which is supported and rotated by conventional means, not shown. The blades are conveniently of a design to furnish good lateral mixing. The mixing vessel 21 is fitted with a conduit 24 for introducing a preformed foam into the lower part of the vessel through a port 25. In the modification shown, the vessel 21 is provided for the injection of the foam through a plurality of ports 25 located at substantially evenly spaced points around the lower end of the vessel 21. The vessel 21 is also equipped with a draw-off valve 26 through which an aerated slurry can be withdrawn from the vessel into a mold, not shown.

In operating the apparatus of FIGURE 3, the desired amount of water can be run into the vessel and the agitator started at a fairly rapid rate. The siliceous component, the calcareous component and the porous light weight aggregate can then be fed into the vessel gradually, suitably in the order given. When these components have been mixed thoroughly to form a substantially uniform slurry, the speed of the agitator is decreased to provide only gentle agitation and a preformed foam of desired characteristics is injected by way of the conduit 24 and the ports 25 into the vessel 21 near the bottom of the charge of slurry therein. Due to the action of the agitator blades 22, the foam is dispersed substantially evenly laterally throughout the slurry and, due to its tendency to rise in the agitated heavy slurry, the dispersed foam is distributed substantially evenly vertically within the charge of slurry. When the desired amount of foam has been injected into the charge, its flow is stopped and, after a slight amount of additional mixing, the charge is drawn off through the valve 26 into suitable molds and indurated as herein described.

In an alternate method for carrying out the mixing operation in the apparatus of FIGURE 3, the calcareous and siliceous components and the water can be placed in the mixing vessel 21 and mixed to form a slurry which is then aerated with a preformed foam in the manner just described. The light weight aggregate is then added to the aerated slurry and the entire charge mixed briefly before being drawn off into molds. In still an alternate procedure, the mold can be filled with the wet granulated porous light weight aggregate and an aerated slurry of the other components prepared in the vessel 21 and drawn off into the mold so that it fills the voids between the pieces of aggregate.

The apparatus shown diagrammatically in FIGURE 4 can be employed, if desired, to carry out the process substantially continuously. In this instance a preliminary mixing vessel 31 of conventional design equipped with an agitator 36 for agitating the contents of the vessel thoroughly is provided in which a slurry of calcareous and siliceous components can be formed rapidly. The slurry is then conveyed substantially continuously by way of a conduit 32, either by gravity or by means of a suitable pump, into an aerating vessel 33. The slurry is injected into the vessel 33 near the bottom, as is also a preformed foam, e.g., by way of a conduit 34, the rates of injection of the slurry and of the foam into the vessel 33 being adjusted to a desired ratio dependent upon the properties of the indurated product desired. The mixing vessel 33 is equipped with a relatively low speed agitator having blades adapted to mix the foam thoroughly with the slurry as the mixture rises in the vessel. Eventually the vessel 33, which is closed at the top and is provided with an overflow conduit 37, becomes filled with aerated slurry which then overflows through the conduit 37 and can be collected directly in molds 38 of suitable design and dimensions supported on a suitable rest 41. The molds 38 are filled with the porous light weight aggregate prior to adding the aerated slurry and sufficient of the latter is added to fill the voids between the particles of aggregate. Alternatively, the aggregate can be added to the mixing vessel 31 along with the other solid components and the water, if desired. In any event, the formed product is eventually indurated, using conventional equipment not shown, under conditions herein described.

It is advantageous to prepare the calcareous and siliceous materials for use in the process by grinding them to a fine powder. This is especially true of the siliceous component which can, with advantage, be ground so that most of it will pass at least a 200 mesh screen. It is, of course, understood that the properties of the product, particularly its compressive strength, will depend to some extent upon the degree of subdivision of the calcareous and siliceous components.

The porous light weight aggregate is also crushed and generally classified, at least roughly, according to size, the particular degree of classification of the aggregate used in any particular instance depending to a considerable extent upon the desired appearance of the calcium silicate hydrate product which is to be prepared and upon the particular application in which it is to be employed as well as, to some extent at least, upon the particular porous light weight aggregate employed. It is generally sufficient and satisfactory to grind the aggregate so that most of it will pass through a ¾ inch or even a ¼ inch mesh screen. Particles of aggregate which have become particularly finely divided, e.g., particles which will pass a 90 or 100 mesh screen, are generally discarded. It is obvious that, if a particular porous light weight aggregate is ground too fine, its porosity will be largely destroyed and it then becomes a calcareous or a siliceous component or merely an inert powder, depending upon its character, and no longer can be called properly an aggregate.

It is, in some instances, preferable, in the interest of uniformity of apperance and properties of the calcium silicate hydrate product, to classify the porous light weight aggregate rather closely as to size, but this is by no means necessary in most instances. In comparatively massive products, pieces of aggregate having an average diameter of about one inch or more can be incorporated in the wet mixture if desired. It is generally advantageous, especially when relatively large pieces of the aggregate are employed, to also employ a certain proportion of smaller pieces so that a greater proportion of the volume of the final product will be occupied by the aggregate, thus reducing correspondingly the volume of the calcium silicate hydrate matrix. The average particle size of the light weight aggregate used, as well as the proportion thereof with respect to the other components, is susceptible to wide variations and these factors can be adjusted to aid in producing a calcium silicate hydrate product of desired characteristics.

The relative proportions of calcareous and siliceous components incorporated in the wet mixture depends upon the particular components employed and their chemical composition. It is known that the optimum ratio of effective lime, i.e., the lime actually available for forming calcium silicate hydrate to the effective silica in the slurry, insofar as its effect upon the strength of the product is concerned, is about 0.95:1, and I prefer to use this ratio. The invention is, however, by no means limited in this respect. The amount of effective lime (CaO) and effective silica ($SiO_2$) in the slurry depends upon the chemical composition of the particular components employed and upon the state of subdivision, and other factors.

The amount of effective lime or silica in a porous lightweight aggregate generally need not be taken into account in calculating the calcareous and siliceous components in the slurry because of the relatively large size of the pieces of aggregate generally employed and the relatively small amount of surfaces of the pieces exposed to reaction conditions during the indurating procedure. This is well illustrated in the case of certain types of slags which, when ground to the requisite fineness, are well adapted to use as siliceous component in making the product of the invention, but the same slag, when foamed by conventional methods and classified as herein described is well adapted to use as a porous light weight aggregate in making the product. Its use as the porous light weight aggregate does not alter appreciably the proportion of siliceous and calcareous components which other factors indicate should be employed. It is, therefore, impossible to define accurately the relative proportions of calcareous and siliceous components which are to be used in all cases. Generally speaking, however, from about 0.75 to about 1.25 parts by weight of siliceous component can, with advantage, be used for each part of calcareous component. In many instances these two components are preferably used in roughly equal amounts by weight.

The greater the proportion of the volume of the indurated product which is occupied by the aggregate, the lower will be the moisture movement of the product. The aggregate can be used at the rate of from about 0.75 to about 1.75 parts by weight of aggregate for each part of the combined calcareous and siliceous components. This may be considered as a preferred range of weight ratios of aggregate to total calcareous and siliceous components. It is apparent that approximately the same weight ratio will persist in the final dry calcium silicate hydrate product as between the weight of the porous light weight aggregate and the aerated calcium silicate hydrate matrix.

The proportion of water used in preparing the slurry should be such that the slurry will flow readily but should not be sufficiently great to cause ready segregation of a solid component or of the foam during the aerating and indurating steps. Although not limiting, satisfactory results have been obtained using from about 0.25 to about 0.55 part by weight of water for each part of combined weight of calcareous, siliceous and light weight aggregate components.

The amount of air or other gas which is incorporated in the wet mixture is capable of variation over wide limits depending upon the apparent density of the calcium silicate hydrate product desired, the properties and proportions of the specific calcareous and siliceous components and of porous light weight aggregate employed, and upon other factors. Although not limiting, it is often found desirable to incorporate sufficient foam in the wet mixture to provide from about 0.2 to about 0.5 volume of gas for each volume of slurry being aerated.

The calcium silicate hydrate product of the invention finds utility in the manufacture of panels, slabs, blocks, bricks and many other construction and decorative units. Because of its strength, the usefulness of the calcium silicate hydrate products in load-bearing applications is extended greatly. Insulating panels in large sizes can be made and laid up with tight flush joints without danger of fracture due to swelling when moist or of the joints opening when dry.

Certain advantages of the invention are apparent from the following examples which are given by way of illustration only and are not to be construed as limiting. Data on the moisture movement given in the examples was determined by the method of British Standard Specification 728–834. Sieves employed in classifying certain of the materials used were British Standard Specification sieves. Compressive strengths and apparent densities of the product were determined by conventional methods. The Portland cement used in the experiments was a grade meeting British standards in which not more than 10 percent remains on a 170 mesh screen. The finely ground sand used was the usual commercial product ground to at least the same degree of fineness as the cement.

*Example 1*

A quantity of crushed foamed slag having an apparent density of 59 to 63 pounds per cubic foot as classified roughly by screening. The portion which passed through a screen having one-fourth inch openings but which remained on an 85 mesh sieve was collected separately. The foamed slag thus collected comprised about 40 percent of calcium and about 30 percent of silicon, each calculated as the oxide. It had a bulk density of about 45 pounds per cubic foot.

A mixture was prepared consisting of 100 pounds of Portland cement, 105 pounds of finely ground sand, 200 pounds of the foamed slag collected as described in the previous paragraph and 160 pounds of water. The components were mixed together thoroughly to form a heavy, wet slurry. A preformed hydrolyzed protein type foam, prepared from 27.7 pounds of a 3 percent aqueous solution of the foaming agent and having an expansion factor of 9, was injected into the bottom of the mixture. The foam was distributed uniformly throughout the slurry by gentle agitation and the aerated slurry then cast into molds for making blocks 12 inches by 12 inches by 3 inches.

The slurry was allowed to stand in the molds for about six hours at a temperature of about 86 degrees Fahrenheit to acquire a preset and the molds and contents were then subjected to action of saturated steam. The steam pressure was brought gradually up to 140 pounds per square inch over a period of about three hours and this pressure was then maintained for fourteen hours. The steam pressure was then gradually decreased over a period of about two hours to atmospheric pressure. The indurated blocks were then removed from the molds, dried in a current of warm air and subjected to a series of tests. The blocks thus produced had the following properties:

Dry apparent density ____pounds per cubic foot__ 44.8
Compressive strength:
    Saturated _____pounds per square inch__ 580
    Dry _____do____ 890
Moisture movement _____percent__ 0.043

*Example 2*

The procedure of Example 1 was repeated using 100 pounds of Portland cement, 110 pounds of finely ground sand, 178 pounds of water and 250 pounds of the same foamed slag used in Example 1, except that it was classified to pass an 18 mesh screen and to remain on an 85 mesh screen. In this instance the foam was prepared from 18.9 pounds of a 2 percent aqueous solution of the hydrolyzed protein and had an expansion factor of 9.

The product obtained had the following properties:

Dry apparent density ____pounds per cubic foot__ 49.2
Compressive strength:
    Saturated _____pounds per square inch__ 702
    Dry _____do____ 1080
Moisture movement _____percent__ 0.014

*Example 3*

A quantity of crushed, well burnt clinker having an apparent density of 56 to 60 pounds per cubic foot was classified and a fraction passing a one-half inch mesh screen and remaining on a one-fourth inch mesh screen was collected separately. This fraction comprised approximately 6 percent of calcium and approximately 44.6 percent of silicon, each calculated as the oxide.

A wet slurry was prepared by mixing thoroughly 100 pounds of quicklime, ground to pass a 44 mesh screen, 95 pounds of finely ground sand, 250 pounds of the fraction of clinker collected according to the procedure of the preceding paragraph and 210 pounds of water. The wet slurry was then aerated by injecting into it a preformed foam by the procedure of Example 1. The foam used had an expansion factor of 9 and was made from 22.4 pounds of a 3 percent aqueous solution of an alkyl napthalene sulphonate stabilized with gelatin as the foaming agent. The foam was distributed through the slurry by gentle agitation. The aerated slurry was then cast into molds for making blocks and indurated with steam as described in Example 1.

The blocks thus obtained had the following properties:

Dry apparent density ____pounds per cubic foot__ 44.1
Compressive strength:
    Saturated _____pounds per square inch__ 880
    Dry _____do____ 1580
Moisture movement _____percent__ 0.034

*Example 4*

A wet slurry was prepared consisting of 100 pounds of Portland cement, 85 pounds of finely ground sand, 225 pounds of the fraction of clinker collected in Example 3, 80 pounds of the same clinker as employed in Example 3, but which had been classified to pass a 100 mesh sieve, and 200 pounds of water. The water employed had previously been heated so that the temperature of the mixed slurry was about 156 degrees Fahrenheit. The mixture was then aerated, following the procedure of Example 1, with a preformed foam prepared from 32.5 pounds of a 2.5 percent aqueous solution of hydrolyzed protein and having an expansion factor of 9. The aerated slurry was then cast into preheated molds for making blocks. The molds and contents were then held in a preheated chamber at about 163 degrees Fahrenheit for 2.5 hours. The temperature was then gradually increased to 194 degrees Fahrenheit and held at this temperature for several hours. Following the heating period, the blocks were removed from the molds and dried.

The blocks thus obtained had the following properties:

Dry apparent density ____pounds per cubic foot__ 43.6
Compressive strength:
    Saturated _____pounds per square inch__ 674
    Dry _____do____ 1002
Moisture movement _____percent__ 0.032

*Example 5*

A quantity of crushed expanded clay having an apparent density of 47 to 50 pounds per cubic foot was classified and the fraction passing through a ¾ inch mesh screen but remaining on a ¼ inch mesh screen was collected separately. The collected fraction had a dry bulk density of 27 pounds per cubic foot.

A wet slurry was prepared consisting of 100 pounds of Portland cement, 100 pounds of finely ground sand, 300 pounds of the expanded clay fraction collected as just described, and 135 pounds of water. The wet slurry was aerated with a preformed foam having an expansion factor of 9 which had been prepared from 20.6 pounds of a solution of an alkyl naphthalene sulfonate stabilized with gelatin. The aeration and subsequent induration procedures were carried out substantially according to the procedure of Example 1.

The product obtained had the following properties:

Dry apparent density ____pounds per cubic foot__ 43.7
Compressive strength:
    Saturated _____pounds per square inch__ 900
    Dry _____do____ 1352
Moisture movement _____percent__ 0.026

*Example 6*

Three hundred pounds of the classified expanded clay used in Example 5 was wetted thoroughly with water and placed in molds. The clay was settled in the molds by gentle vibration.

A wet slurry was prepared consisting of 100 pounds of Portland cement, 100 pounds of finely ground sand and 140 pounds of water. The wet slurry was then aerated with a preformed foam, using the same amount of the same foam and the same procedure as in Example 5. The aerated slurry was then poured over the expanded clay in the molds so as to fill completely the spaces not occupied by the particles of expanded clay. The mold and contents were then subjected to the presetting and indurating procedure substantially as described in Example 1. The final indurated product obtained had the following properties:

Dry apparent density ____pounds per cubic foot__ 44.4
Compressive strength:
    Saturated _____pounds per square inch__ 924
    Dry _____do____ 1378
Moisture movement _____percent__ 0.027

*Example 7*

A quantity of crushed pumice, having an apparent density of 43 to 47 pounds per cubic foot was classified and the fraction passing a ¾ inch mesh screen and remaining on a ¼ inch mesh screen was collected separately. The fraction thus collected comprised 6.1 percent of calcium and 64.3 percent of silicon, each calculated as the oxide.

A wet slurry was prepared consisting of 100 pounds of quicklime ground to pass a 44 mesh screen, 95 pounds of finely ground sand and 235 pounds of water. The slurry was aerated according to the procedure of Example 1 with a preformed foam having an expansion factor of about 9 and prepared from 21.8 pounds of a 2 percent aqueous solution of a stabilized rosin soap foaming agent. The aerated slurry was then poured into molds containing 250 pounds of the fraction of pumice which had been collected as described in the preceding paragraph and wetted with water, and allowed to fill the spaces between the particles. The indurating procedure was carried out substantially as in Example 1. The hardened product, after removal from the mold and drying, had the following properties:

Dry apparent density ____pounds per cubic foot__ 42.1
Compressive strength:
    Saturated _____ pounds per square inch__ 960
    Dry _____do____ 1740
Moisture movement _____percent__ 0.033

*Example 8*

A slurry was prepared consisting of 100 pounds of Portland cement, 35 pounds of finely ground sand, 175 pounds of pulverized fuel ash (fly ash), 200 pounds of foamed slag classified as in Example 1 and 240 pounds of water. A preformed foam having an expansion factor of 9 was prepared from 22.4 pounds of a 3 percent aqueous solution of hydrolyzed protein. The slurry was aerated with the preformed foam and the aerated slurry was molded, preset and indurated, all following substantially the procedure of Example 1.

The calcium silicate hydrate product thus prepared had the following properties:

Dry apparent density ____pounds per cubic foot__ 47.8
Compressive strength:
    Saturated _____pounds per square inch__ 646
    Dry _____do____ 970
Moisture movement _____percent__ 0.042–0.044

I claim:

1. In a method for making an indurated, light weight calcium silicate hydrate product, the steps which include: providing a body of a slurry comprising a calcareous component, a siliceous component and water, the amount of water being proportioned to provide a stable slurry; injecting a predetermined volume of a preformed foam under pressure beneath the surface of said body; and agitating the mixture of foam and slurry to distribute the foam substantially evenly throughout the body.

2. The method as specified in claim 1 wherein the slurry includes a porous light-weight aggregate.

3. The method specified in claim 1 followed by the steps of forming the slurry in a mold and subjecting the formed slurry to superatmospheric pressure steam to form a dense calcium silicate hydrate matrix with interspersed spherical voids.

4. In a method for making an indurated, light weight calcium silicate hydrate product, the steps which include: agitating a mixture comprising a calcareous component, a siliceous component, a porous light weight aggregate and water to form a body of a substantially uniform slurry, the amount of water being proportioned to provide a stable slurry; agitating the body of slurry and injecting preformed foam under pressure beneath the surface of the body of slurry to form an aerated slurry; transferring the aerated slurry to a mold; and subsequently indurating the molded slurry to form an indurated product comprising a plurality of particles of porous light weight aggregate surrounded substantially entirely and bonded by a rigid matrix of aerated calcium silicate hydrate.

5. The method of claim 4 wherein the amount of siliceous component used is from about 0.75 to about 1.25 parts by weight for each part of calcareous component used and the amount of light weight porous aggregate used is from about 0.75 to about 1.75 parts by weight for each part of combined weight of siliceous and calcareous components used.

6. The method of claim 4 wherein the formation of the slurry and its aeration are carried out at a temperature up to about 150 degrees Fahrenheit.

7. The method of claim 4 wherein the mixture in the mold is first allowed to stand until it has preset and the induration is then completed by heating at an elevated temperature in an atmosphere substantially saturated with water vapor.

8. In a method for making an indurated, light weight calcium silicate hydrate product, the steps which include: agitating a mixture comprising a calcareous component, a siliceous component and water to form a body of a substantially uniform slurry; agitating the body of slurry and injecting thereinto near the bottom of the body a predetermined amount of a preformed foam; continuing the agitation until the foam is distributed substantially evenly throughout the body of the slurry to form an aerated slurry; placing a predetermined amount of a porous light weight aggregate in a mold; adding the aerated slurry to the mold to fill substantially the space therein unoccupied by the pieces of aggregate; and subsequently indurating the molded mass whereby there is produced an indurated product comprising a plurality of particles of porous light weight aggregate each surrounded substantially entirely by a rigid matrix of aerated calcium silicate hydrate, the matrix and the aggregate being bonded firmly together.

9. The method of claim 8 wherein the porous light weight aggregate is wetted with water prior to addition of the slurry to the mold.

10. An article comprising a plurality of pieces of porous light weight aggregate embedded in and bonded securely to a matrix of an indurated calcium silicate hydrate, the matrix containing a plurality of small substantially non-communicating spherical voids comprising about two-tenths to five-tenths of the total volume and the product being characterized by a low bulk density, a high compressive strength and a low moisture movement, produced by the process of claim 4.

11. An article as claimed in claim 10 wherein the porous light-weight aggregate comprises, on a dry basis, from about 0.75 to about 1.75 parts by weight for each part of calcium silicate hydrate matrix.

12. An article as claimed in claim 10 wherein the pieces of porous light aggregate have an apparent density of from about 10 to about 80 pounds per cubic foot.

13. A process for the manufacture of vesicular calcium silicate hydrate which comprises: continuously introducing into the bottom of a vessel an aqueous slurry of finely divided calcareous and siliceous components and a foam, agitating the slurry and foam in the vessel to intermix them, and discharging the vesicular mixture from the top of the vessel into a mold, then indurating the mixture in superatmospheric pressure steam.

References Cited in the file of this patent
UNITED STATES PATENTS

| | | |
|---|---|---|
| 1,782,384 | Greider | Nov. 18, 1930 |
| 1,932,971 | Huttemann | Oct. 31, 1933 |
| 1,963,030 | Powell | June 12, 1934 |
| 2,243,369 | Albert | May 27, 1941 |
| 2,282,190 | Jahjah | May 5, 1942 |
| 2,476,306 | King | July 19, 1949 |
| 2,540,354 | Selden | Feb. 6, 1951 |